W. A. BASS.
ELECTRIC FLY TRAP.
APPLICATION FILED MAR. 11, 1916.
1,247,488. Patented Nov. 20, 1917.
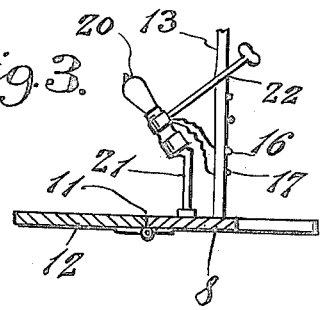
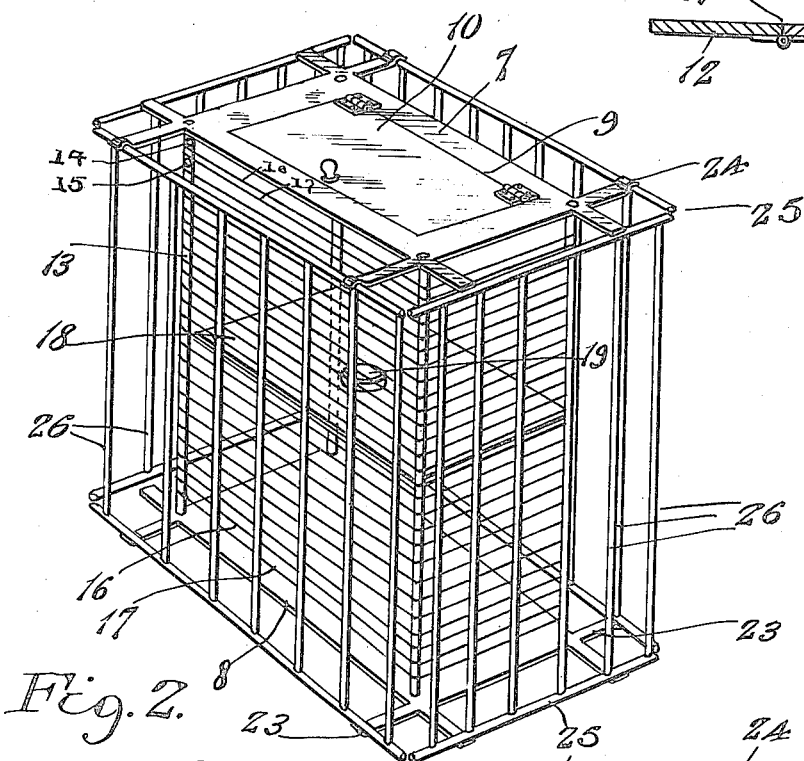
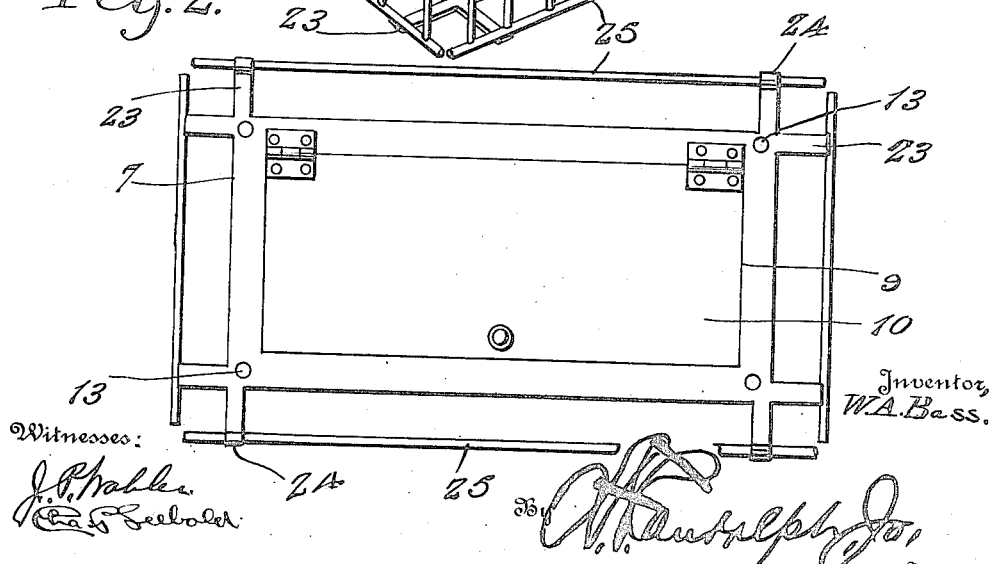
Inventor,
W. A. Bass.
Witnesses:

UNITED STATES PATENT OFFICE.

WILLIAM A. BASS, OF RIO VISTA, TEXAS.

ELECTRIC FLY-TRAP.

1,247,488. Specification of Letters Patent. Patented Nov. 20, 1917.

Application filed March 11, 1916. Serial No. 83,584.

*To all whom it may concern:*

Be it known that I, WILLIAM A. BASS, a citizen of the United States, residing at Rio Vista, in the county of Johnson and State of Texas, have invented certain new and useful Improvements in Electric Fly-Traps; and I do hereby declare the following to be a full, clear, and exact description of the invention, such as will enable others skilled in the art to which it appertains to make and use the same.

This invention relates to improvements in electric fly traps, and more particularly to an improvement over the trap described and claimed in my prior Patent No. 1,159,157, November 2, 1915.

The invention has for its object to provide an improved trap in which the flies or other insects are electrocuted as they enter the trap and further to provide a lamp connected in circuit with the electric wires of the trap and adapted to attract the insects at night or when the trap is placed in a dark spot.

With this and other objects in view, the invention consists in the novel construction, combination and arrangement of parts as will be hereinafter specifically described, claimed and illustrated in the accompanying drawings, in which:

Figure 1 represents a perspective view of the improved fly trap,

Fig. 2 represents a top plan view thereof.

Fig. 3 represents a fragmental detail sectional view through the lower portion of the trap, illustrating the electric illuminating lamp in detail.

Referring to the drawings in detail, wherein similar reference numerals designate corresponding parts throughout the several views, the numerals 7 and 8 indicate the top and bottom of the trap in section, the top having an entrance opening 9 therein normally closed by a hinged door 10. The bottom 8 is also provided with an entrance opening 11, which is closed by a door 12. Four or more corner posts 13 are arranged adjacent the corners of the top and bottom 7 and 8, respectively, and are constructed of a suitable insulating material. Binding posts 14 are secured adjacent one end of the top 7 and are adapted to be connected with the electric feed wires of a building. The sides of the trap are formed by wires 16 and 17, which are connected with the binding posts 14 and 15, respectively, and are coiled about the corner posts 13 intermediate the top and bottom 7 and 8. The wires 16 and 17 are spaced such a distance apart as to insure that an insect passing between the wires will simultaneously come in contact with both wires, thereby completing a circuit and causing its electrocution.

A tray 18 is removably supported centrally within the trap and a container 19 is supported thereon and is adapted to receive a suitable bait.

The lower terminals of the wires 16 and 17 are connected with an electric incandescent lamp 20, which latter is carried by a support 21 terminating in the upper or lower portion of the trap, as desired. The lamp 20 is controlled by the usual type of switch operable by a turning key 22, which extends outwardly between several of the wires 16 and 17 so as to be conveniently operable exteriorly of the trap. The top and bottom 7 and 8, respectively, are provided with pairs of laterally projecting spring arms 23, having curved outer ends 24 receiving the upper and lower rectangular frames 25 of a guard, which includes also the vertically disposed bars 26. The bars 26 are arranged in spaced relation to each other and to the wires 16 and 17, and are designed to prevent a person from accidentally coming in contact with the wires and consequently being shocked by the electric current passing therethrough.

What I claim is:

1. An electric trap including a top, a bottom, insulating corner posts connecting the top and bottom, electric conducting wires arranged in spaced relation and coiled about said corner posts, spring arms carried by the top and bottom, and a guard removably engaged in said spring arms.

2. An electric trap including a top, a bottom, a plurality of vertically disposed insulating posts connecting the top and bottom, electric conducting wires arranged in spaced relation and coiled about said corner posts, a plurality of laterally projecting spring arms carried by the top and bottom having curved outer ends, and a guard removably engaged between the curved outer ends of the arms carried by the top and bottom.

3. An electric trap including a top, a bottom, insulating corner posts connecting the top and bottom, electric conducting wires arranged in spaced relation and coiled about the corner posts, spring arms carried by the top and bottom, and a plurality of independently removable guards engaged in the spring arms and held in spaced relation to the wires.

In testimony whereof I affix my signature in presence of two witnesses.

WILLIAM A. BASS.

Witnesses:
   C. R. TALLEY,
   S. W. COOPER.